United States Patent [19]

Stegner

[11] Patent Number: 4,571,998

[45] Date of Patent: Feb. 25, 1986

[54] IN-GROUND TANK MEASURING SYSTEM

[76] Inventor: Kevin Stegner, 21 Wilstand Ave., Patchogue, N.Y. 11772

[21] Appl. No.: 631,992

[22] Filed: Jul. 18, 1984

[51] Int. Cl.⁴ .................. G01F 23/10; G01D 21/02
[52] U.S. Cl. .................................. 73/321; 73/313; 340/870.16; 340/624
[58] Field of Search ............ 73/321, 1 H; 33/126.6; 340/623, 624; 328/165

[56] References Cited

U.S. PATENT DOCUMENTS

| | | | |
|---|---|---|---|
| 3,154,946 | 11/1964 | Ordorica et al. | 73/313 |
| 3,459,042 | 8/1969 | Brown | 73/313 |
| 3,555,905 | 1/1971 | George | 73/321 |
| 3,972,235 | 8/1976 | Frayer | 73/311 |
| 3,974,695 | 8/1976 | Lerner | 73/313 X |
| 4,086,812 | 5/1978 | Luthe et al. | 73/313 |
| 4,255,859 | 3/1981 | Klieman | 33/126.6 |
| 4,487,065 | 12/1984 | Carlin et al. | 340/870.16 X |
| 4,523,460 | 6/1985 | Strickler et al. | 340/870.16 X |

Primary Examiner—D. M. Yasich
Attorney, Agent, or Firm—Leonard Belkin

[57] ABSTRACT

An in-ground tank measuring system for monitoring the level of fuel in a plurality of tanks. A float is provided in each tank connected by cable to a biased take-up reel connected to a potentiometer. A palm-sized monitor with provision to switch from one potentiometer has a switch to select the tank to be monitored, supply the reference voltage, receive the wiper voltage, and produce a liquid crystal digital display of fuel level.

4 Claims, 5 Drawing Figures

IN-GROUND TANK MEASURING SYSTEM

BACKGROUND OF THE INVENTION

This invention relates to an in-ground tank measuring system for monitoring the level of gasoline and other fuels and more particularly to an arrangement which safely, economically, and conveniently gives instantaneous and accurate readings of fuel levels in underground tanks such as those employed in gasoline stations.

In many if not most automobile service stations which dispense gasoline and other liquid fuels, underground tanks store the fuels and dip sticks are employed to take readings of the levels within the tanks at frequent intervals. Hence the process of keeping track of the amounts dispensed is very rough and cannot be relied upon for accurate information.

The use of dip sticks for this purpose at this time as the preferred technique for keeping track of the amount of fuel still in storage is probably due at least in part to the great expense and complexity of automatic measuring systems which have been devised up to now, and possibly due in part to certain risk factors involved especially in the case of gasoline which is highly volatile.

Some of these automatic level monitoring systems are shown in U.S. Pat. Nos. 3,074,274, 3,459,042, 3,935,741, 3,972,235, and 4,255,859. In the patent to Frazer, it is noted that an electrical current passes through conductors within the tank, and this arrangement is considered too dangerous for normal use. Only the patents to Frazer and Klieman appear to show the monitoring of more than one tank at a time, and all arrangements are too complex and expensive for use by a local gasoline station.

SUMMARY OF THE PRESENT INVENTION

The present invention is for a system capable of monitoring accurately, inexpensively, safely, and instantly the level of liquid in a number of underground tanks and provide a digital display of same.

A preferred embodiment of this invention comprises the use of a float in each of the underground tanks, a cable attached to each float extending up and out of the tank, a spring biased take-up reel to take up the slack in each cable, a multiple turn linear potentiometer connected to rotate with the shaft of each take-up reel, a low voltage power supply to impress an emf across the potentiometer, and a liquid crystal digital readout display located remotely responsive to the position of the wiper on said potentiometer for indicating the position of said float and hence the liquid level within said tank. A switch is provided to switch from one take-up reel to another, hence, selecting the particular tank for which a reading is taken. Warning lights are included to indicate when a tank is near empty. The system is so sensitive and accurate that only one volt need be placed across the potentiometer so that the digital readout may be battery operated and hence its location is not dependent on a nearby power source.

It is thus a principal object of this invention to provide an inexpensive yet accurate and reliable system for monitoring the level of gasoline or other fuel in underground tanks.

Other objects and advantages of this invention will hereinafter become obvious from the following description of a preferred embodiment of this invention.

DETAILED DESCRIPTION OF THE PREFERRED EMBODIMENT

Figure 1:
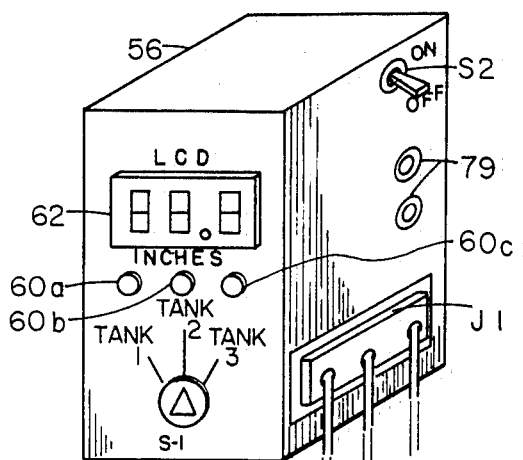
FIG. 1 is a schematic illustration of a preferred embodiment of the system for three underground tanks.
Figure 3A:
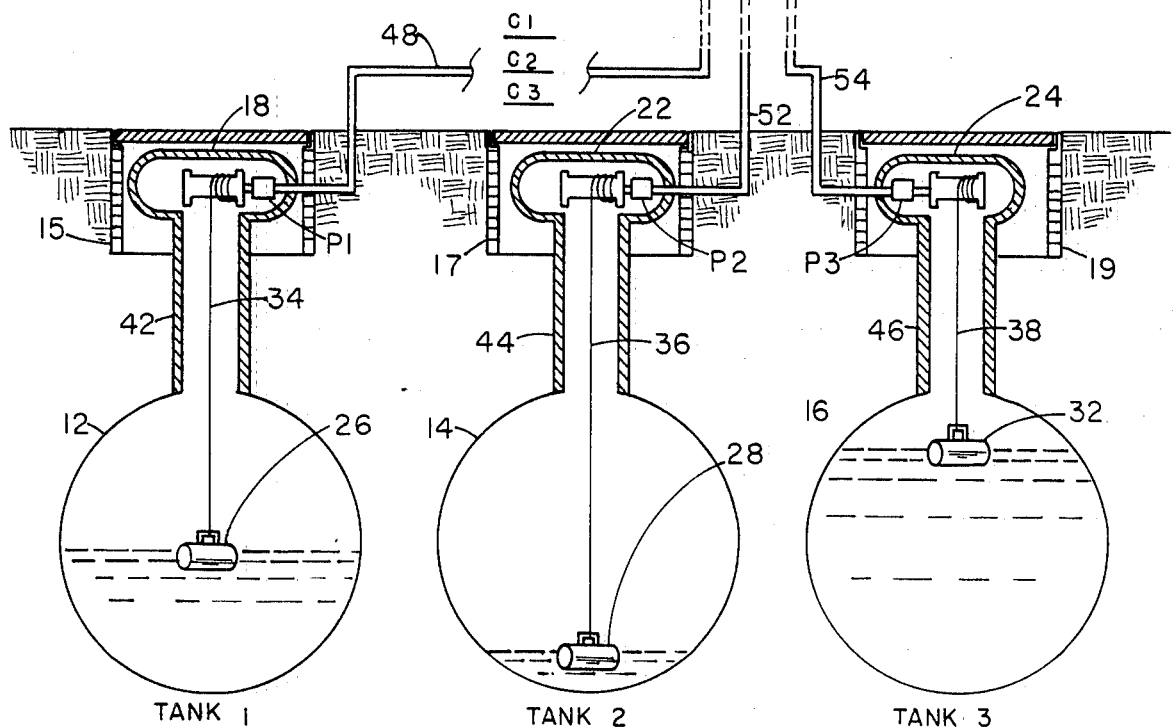
FIG. 3a is a front view of a transducer.
Figure 3A:
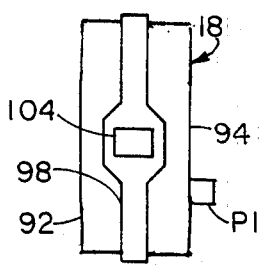

Referring to FIG. 1, a system embodying the principles of this invention for remotely monitoring the level of fuel in underground tanks 12 (tank 1), 14 (tank 2), and 16 (tank 3) includes a transducer 18, 22, and 24 for each of the aforementioned tanks, respectively. In each of the tanks is a float 26, 28, and 32 floating in the surface of the fuel within each of the tanks. A cable 34, 36, and 38 connected to each of said floats passes up through vents 42, 44, and 46 and is wound on its transducer reel.

Each float is of sufficient size and weight to float on a liquid surface and overcome its take-up spring force. The float is connected to its take-up reel in a respective transducer with a stainless steel cable of sufficient strength and permeability as to unreel and retract itself without distortion. When unreeled its shape will be straight and retracted to temporarily conform to its circular shape. The surface area of each take-up reel and size of cable is sufficient to wind the cable multiple turns without the cable winding on itself.

Transducers 18, 22, and 24 are identical and are sufficiently biased in the wind-up direction so as to take up the slack in the cable. While not shown, it is understood that underground tanks are provided with openings for receiving fuel and suction hoses or pipes for withdrawing the fuel as needed.

Included in each transducer, 18, 22, and 24 and attached to the wind-up shaft is a multi-turn potentiometer $P_1$, $P_2$, and $P_3$, respectively. In this embodiment, each potentiometer is a ten turn linear potentiometer whose range of operation would be from a level as low as 3 inches from the bottom to a depth of 96 inches which covers virtually all existing tank designs.

To each of the potentiometers is connected an electrical cable 48, 52, and 54, respectively, which terminates in a jack J-1 connected to monitor 56 in which is located a selector dial S-1 for connection with one cable at a time. A digital readout display 62 is also provided on monitor 56. It is understood that monitor 56 may be located remotely in an office or service area convenient to personnel charged with the responsibility of keeping track of fuel remaining in the tanks. Monitor 56 may also be provided with warning LED's 60a, 60b, and 60c to indicate when a tank is close to empty.

As illustrated in cable 48, each cable is provided with three electric conductors, $C_1$, $C_2$, and $C_3$. Conductor $C_1$ provides the emf across potentiometer $P_1$, conductor $C_2$ is the voltage picked up by the wiper within the potentiometer indicating its position, and conductor $C_3$ is grounded.

Figure 2A:
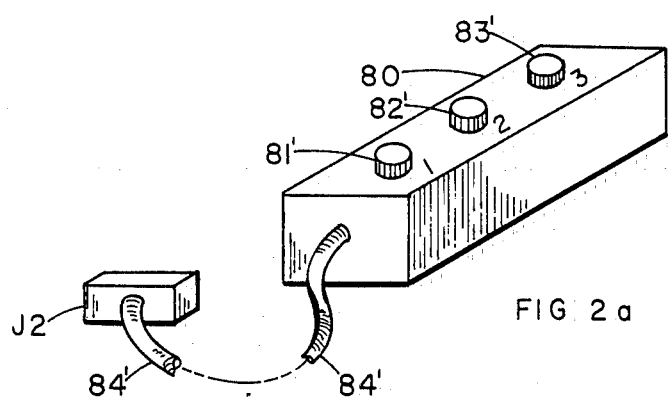
FIG. 2a is an isometric view of a testing/calibration accessory.
Figure 2:
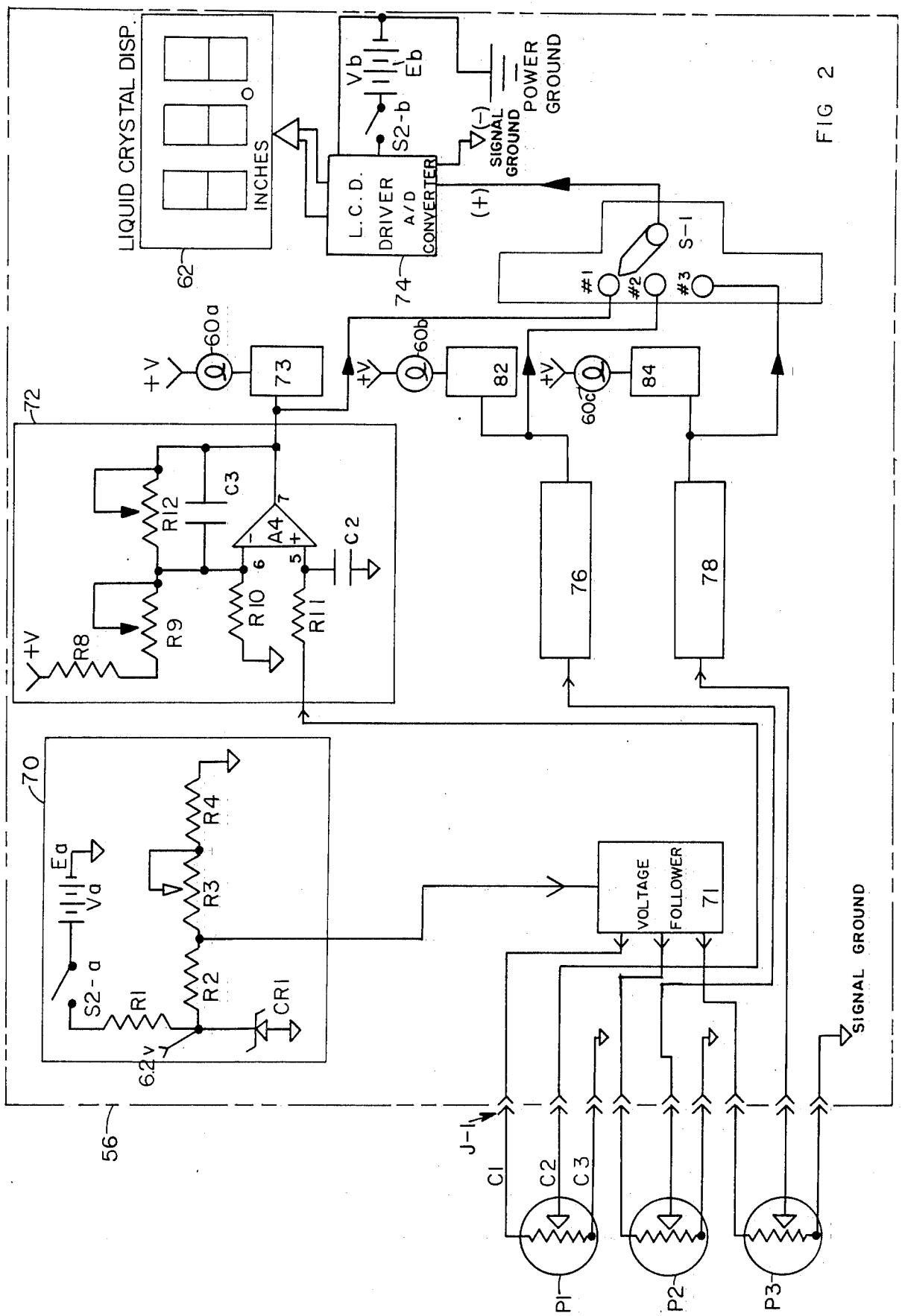
FIG. 2 shows a functional diagram for the system shown in FIG. 1.

Referring to FIG. 2, monitor 56 includes a reference voltage circuit 70 having a switch S2-a (power on/off switch), resistor $R_1$ and zener diode $CR_1$ to produce a reference voltage which for the embodiment being described is 6.2 volts at the junction of resistor $R_1$ and diode $CR_1$. An adjustable voltage divider consisting of fixed resistors $R_2$ and $R_4$, and adjustable resistor $R_3$ permits output of circuit 70 to be set at 1.0 vdc which is applied to a conventional voltage follower circuit 71. Battery Ea supplies the reference voltage supply Va.

A constant 1.0 vdc is applied across potentiometer $P_1$ from circuit 71. The position of the wiper in potentiometer $P_1$ reflects the position of float 26 in tank #1 as previously explained and hence the level of liquid therein, so that the voltage picked off by the wiper is a direct function of the level. This voltage is applied to the input of operational amplifier $A_4$ in circuit 72, the input signal being filtered by resistor $R_{11}$ and capacitor $C_2$. There is a linear response throughout the range of amplifier $A_4$. Since there is no minus power supply, the combination of resistors $R_8$ and $R_9$ injects a positive voltage to the inverting input to amplifier $A_4$ (pin 6) which helps amplifier $A_4$ to overcome its inherent offset voltage limitation. As a result, a reading down to as low as three inches of fuel in the tank can be displayed.

The gain of amplifier $A_4$ is unity plus the adjustment provided by resistor $R_{12}$ divided by resistor $R_{10}$ for a voltage present at pin 5. Empty and full adjustments for any tank of any shape or size are made in amplifier $A_4$ by adjusting the values of resistors $R_9$ and $R_{12}$.

Capacitor $C_3$ prevents the output of amplifier $A_4$ from oscillating.

The output of circuit 72 is connected to comparator/LED drive 73 bypassing tank selector switch S-1 to provide energization for LED 60a when the level in tank #1 reaches close to empty, for example, one quarter full. The output of circuit 72, representing the position of the wiper in potentiometer $P_1$ is also delivered to contact #1 on switch S-1. It is readily apparent that although selector switch S-1 is utilized to select the fuel level to be displayed at LCD 62 in monitor 56, the operation of warning LED's 60a, 60b, and 60c is not dependent on switch position so that regardless of the position of switch S-1, every warning light is functional for display when its tank reaches the warning level, an important feature of this invention.

It will also be noted that with the signal output of circuit 72 transferred to switch S-1, where if tank #1 is selected for display, that signal will be transferred to a microchip A/D converter integrated circuit 74 of conventional design which drives liquid crystal display 62 showing the level of fuel within tank #1. Chips having this capability are commercially available and one such chip which has been used successfully in this system is Intersil 7106. This embodiment employs three seven segment digits and a constant decimal point display. For example, where tank level is 96 inches the display will be 96.0. Where the level is 8½ inches the display will read 8.5 with the leading digit (zero) blanked.

Circuits 76 and 78 which receive the wiper outputs from potentiometers $P_2$ and $P_3$, respectively, are identical to circuit 72, delivering their outputs to switch positions #2 and #3, respectively, of switch S-1 and comparator/LED drives 82 and 84, respectively, to energize LED's 60b and 60c, respectively, in the event either or both of tanks #2 and #3 reach the predetermined close to empty position of the floats therein. Power supply for A/D converter circuit 74 is from a battery Eb which supplies Vb through switch $S_2$-b. Switches $S_2$-a and $S_2$-b are ganged in a single throw switch S2 shown in FIG. 1 so that they are turned on together.

It will be noted that there are separate grounds for the signal circuits (i.e., signal ground represented by the hollow arrow) and the power supply Eb for circuit 74 (i.e. power ground) shown in FIG. 2. The purpose of this arrangement is to limit the noise present in the signal circuit, as will be explained later. Voltage supply +V for LED's 60a, 60b, and 60c as well as circuits 72, 76, and 78 is from battery Ea.

In the operation of the system just described, switches $S_2$-a and $S_2$-b are closed. Once monitor 56 is calibrated for tank empty and tank full positions (resistors $R_9$ and $R_{12}$ for tank #1) and resistor $R_3$ previously adjusted for the reference voltage, no further adjustment is necessary. Reference input voltage Va and supply voltage Vb can be supplied by using two inexpensive 9 volt batteries or, in the alternative, can utilize a battery eliminator which converts 117 vac to 9 vdc. In such a case, battery eliminators which are U.L. approved can be jacked into monitor 56 at a 9 vdc input shown in jacks 79, and the a.c. to d.c. conversion will take place before reaching the indicator unit. Since a choice of supply sources is available in either battery or a.c. to d.c., the installation will determine which method of power is to be utilized. If the battery method of power is to be utilized, extended battery life can be achieved by the omission of LED warning lamps to dramatically reduce the current consumption of the indicator unit.

Regarding the calibration of the system just described, it is not necessary to undertake this for each tank starting from empty to full. This can be accomplished by utilizing the testing/calibration accessory 80 shown in FIG. 2a. Accessory 80 contains three potentiometers identical to potentiometers $P_1$, $P_2$, and $P_3$ operated by dials 81', 82', and 83', respectively, connected by cable 84' carrying separate conductors (three for each potentiometer) as in the arrangement of FIG. 2 to a jack J-2 which replaces jack J-1 in monitor 56. By adjusting dials 81', 82', and 83' between minimum and maximum positions representing liquid levels in the tanks it is possible to calibrate or test the operation of the system.

Figure 3:
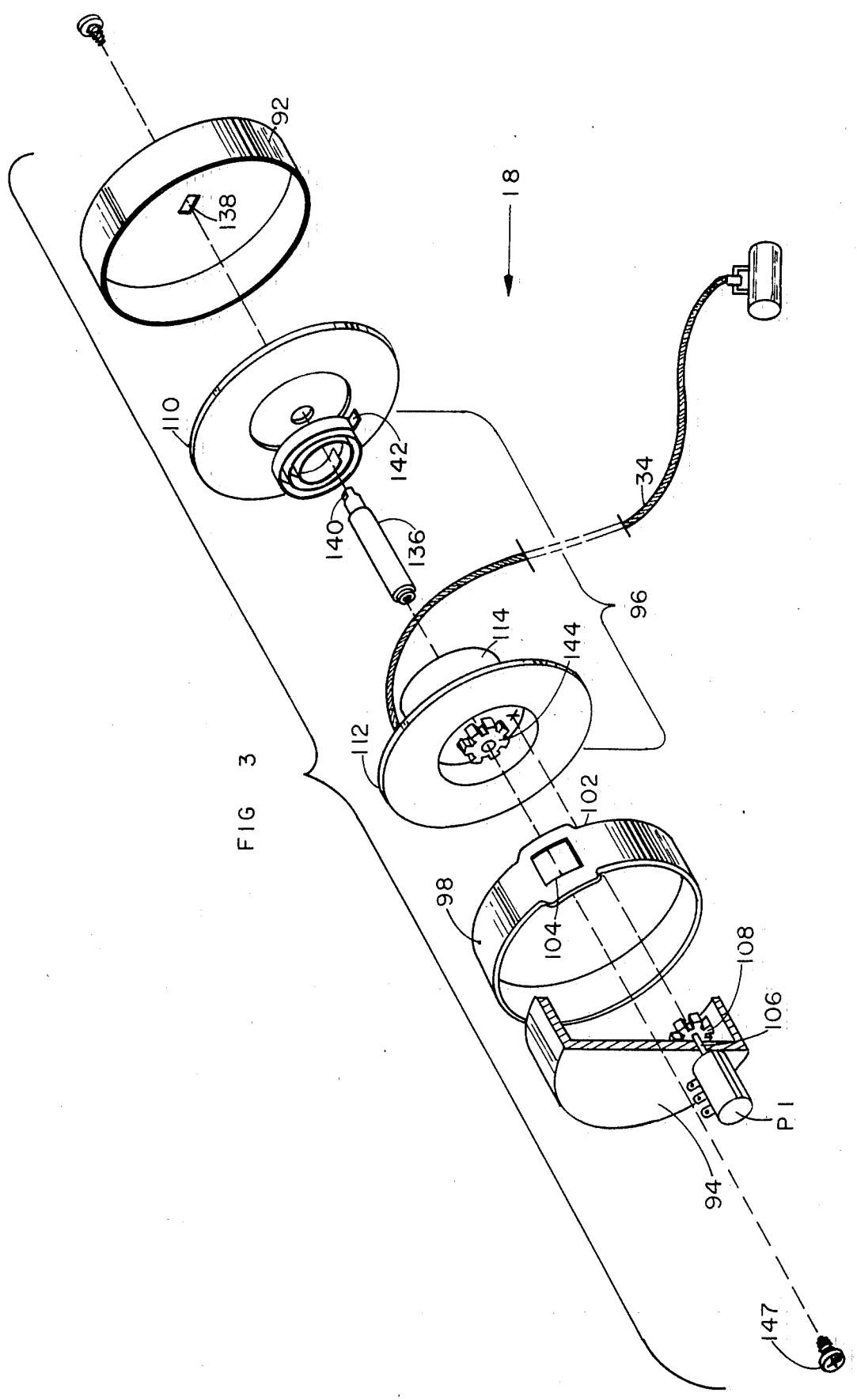
FIG. 3 is an exploded view of a transducer.

Referring to FIG. 3 for details of transducer 18 which is identical to transducers 22 and 24, it is seen that the former consists of a pair of circular covers or clam shells 92 and 94, a take-up reel 96, and an outer band 98 with a widened section 102 having an opening 104 for the passage of cable 34.

On the outside of clam shell 94 is mounted potentiometer $P_1$ with a shaft 106 connected to a gear 108 on the inside.

Take-up reel 96 has a pair of flanges 110 and 112 and a circular body 114 on which cable 34 is wound. A stationary shaft 136 extends through reel 96 and is supported on clam shells 92 and 94 and is kept from rotating by the use of a rectangular slot 138 on cover 92 with shaft 136 having a matching rectangular end 140. Reel 96 is rotatable on shaft 136 but a spring 142 within body 114 connecting the latter to shaft 136 biases reel 96 in the direction of winding up cable 34.

A gear 144 mounted on reel 96 engages gear 108 when transducer 18 is assembled effectively rotates the wiper within potentiometer $P_1$ when reel 96 rotates. When assembled, transducer 18 is a compact device with reel 96 sandwiched between shells 92 and 94 and surrounded by band 98 with opening 104 for cable 34, held together by shaft 136 with threaded screws 147 tapped into the ends of shaft 136. The clam shell configuration of transducer 18 makes a very compact yet reliable and inexpensive arrangement for producing the desired signal and can be placed in locations with severe limitations on space.

When the float position within tank #1 changes, take-up reel 96 rotates which turns gears 144 and 108 and hence rotates potentiometer $P_1$ shaft. The result is a changing proportional d.c. voltage present on conductor $C_2$ of electrical cable 48. The source of this d.c. voltage, as aleady noted, comes from the reference voltage potential across potentiometer $P_1$.

A modular feature is also incorporated into this embodiment as transducers 18, 22, and 24 are readily replaced should the need arise. Since the cables are jacked into monitor 56 as illustrated in FIGS. 1 and 2, direct replacement can be made at no compromise in accuracy or reliability. If a partial failure should occur such as a float sinking, floats 26, 28, and 32 may be replaced without replacing the entire transducer unit.

Consideration has been given to eliminate noise interference which may be present at the unit's working environment. Examples of noise interferences are motors, fluorescent lighting, and refrigeration equipment which generates current spikes and/or voltage changes. As transducers 18, 22, and 24 are located remotely from indicator 56, electrical cables 48, 52, and 54, are apt to be lengthy. Throughout this length, the cable can be subjected to a noisy interference and by using two voltage sources Ea and Eb, input signal (Va) is floating with respect to power supply (Vb), and are provided with separate grounds, as previously noted. Hence a differential input signal is used which improves rejection of interfering noise. Also, by making the reference voltage adjustable, this assures that throughout the manufacturing effort a tolerance buildup of components is not experienced and this eliminates the need for hand selecting components which creates costly and timely delay.

In the system just described it is seen that there has been provided apparatus capable of monitoring accurately and continuously the liquid level content of a plurality of tanks. The display is convenient and operation requires very little power, so little in fact, that it is not dependent on an outside power source. In addition, the results are available instantly so that fuel delivery errors are detected at the time of delivery rather than the results of measurements.

The apparatus can readily be adapted to indicate instantaneously the theft of fuel in progress. For example, the circuits which operate LED drivers 60*a*, 60*b*, and 60*c* to indicate fuel level at ¼ full can be connected to an alarm system to signal a control station or a remote station that the tank is being emptied.

Furthermore, the system is safe as there is no current injected into the fuel tank as in some other proposed systems.

While only a single preferred embodiment of this invention has been described, it is understood that many variations in the design can be accommodated without departing from the principles of this invention as defined in the claims which follow.

What is claimed is:

1. A system for monitoring the level of liquid fuel in each of a plurality of underground tanks comprising a float resting on the surface of said liquid fuel in each of said tanks, cable means connected to each float extending vertically upwardly and out of each said tank, and transducer means including biased take-up reel means for the winding thereon of each of said cable means, each said reel means being biased to take up any slack in said cable means, and potentiometer means having a wiper coupled to said reel means for indicating the level of said liquid fuel in each said tank, and monitor means connected by electrical cable means to all of said potentiometer means for displaying in digital form the level of fuel in a selected tank and a warning when a predetermined level is reached in any one of said tanks, said monitor means comprising means to generate a reference voltage and apply same across each of said potentiometer means, means to receive the voltage signals picked off by each wiper, each of said signals being a direct indication of the level of fuel in each of said tanks, switch means to select one of said voltage signals, means for converting the selected voltage signal into the aforesaid digital readout display for indicating directly and virtually instantaneously the level of fuel in the tank whose voltage signal was selected, a separate power source for said converting means, means bypassing said switch means for identifying and producing a warning signal when the level of fuel drops to a predetermined value in any one of said tanks, separate electrical grounds being provided for the reference voltage and said power source to reduce the effects of interference noise on said voltage signals, and means to adjust the reference voltage and means to adjust the tank empty and full level signals for each of the tanks.

2. The monitoring system of claim 1 having accessory means for replacing said cable means connected to said monitor means for calibrating and testing the operation of said monitoring system.

3. The monitoring system of claim 2 having a single switch means for energizing the system by connecting both the reference voltage and power sources to their respective circuitry.

4. The monitoring system of claim 3 in which said transducer means consisting of said take-up reel means is mounted within a pair of clam shells and a band covering the circumference thereof with an opening for said cable means, each said potentiometer means mounted on the outside of one of said clam shells forming a compact device.

* * * * *